US012380820B2

(12) United States Patent
Chen

(10) Patent No.: US 12,380,820 B2
(45) Date of Patent: Aug. 5, 2025

(54) PROJECTION DEVICE, CONTROL CIRCUIT AND CONTROL METHOD THEREOF

(71) Applicant: Qisda Corporation, Taoyuan (TW)

(72) Inventor: Chuan Chu Chen, Taoyuan (TW)

(73) Assignee: Qisda Corporation, Taoyuan (TW)

( * ) Notice: Subject to any disclaimer, the term of this patent is extended or adjusted under 35 U.S.C. 154(b) by 0 days.

(21) Appl. No.: 18/666,765

(22) Filed: May 16, 2024

(65) Prior Publication Data

US 2025/0014488 A1 Jan. 9, 2025

(30) Foreign Application Priority Data

Jul. 5, 2023 (CN) ......................... 202310819893.1

(51) Int. Cl.
*G09G 3/00* (2006.01)
*G09G 5/10* (2006.01)

(52) U.S. Cl.
CPC ............... *G09G 3/002* (2013.01); *G09G 5/10* (2013.01); *G09G 2310/0243* (2013.01); *G09G 2310/0289* (2013.01)

(58) Field of Classification Search
CPC .. G09G 3/002; G09G 5/10; G09G 2310/0243; G09G 2310/0289
See application file for complete search history.

(56) References Cited

U.S. PATENT DOCUMENTS

2008/0111628 A1* 5/2008 Tsuchi ................. G09G 3/3688 345/87
2011/0007057 A1* 1/2011 Fukuo .................. G09G 3/3614 345/87
2023/0290296 A1* 9/2023 Henzen ................... H03M 1/66

* cited by examiner

*Primary Examiner* — Antonio Xavier

(57) ABSTRACT

A projection device, a control circuit and a control method thereof are provided. The control circuit includes a plurality of voltage level shifters and an operation circuit. The voltage level shifters respectively receive a plurality of selection signals, and shift peak voltages of the selection signals to generate a plurality of processed signals. The operation circuit executes signal decoding operation to generate a plurality of strobe signals according to the processed signals. The operation circuit respectively provides the strobe signals to a plurality of drivers of a driving device, so that the drivers respectively generate a plurality of driving signals.

18 Claims, 2 Drawing Sheets

PROJECTION DEVICE, CONTROL CIRCUIT AND CONTROL METHOD THEREOF

CROSS-REFERENCE TO RELATED APPLICATION

This application claims the priority benefit of China application serial no. 202310819893.1, filed on Jul. 5, 2023. The entirety of the above-mentioned patent application is hereby incorporated by reference herein and made a part of this specification.

BACKGROUND

Technical Field

The disclosure relates to a projection device, a control circuit, and a control method thereof.

Description of Related Art

In pico projector devices, an application specific integrated circuit (ASIC) and a power management integrated circuit (PMIC) are commonly utilized to complete system operation. Under such a structure, there are certain limitations on the brightness (number of lumens) that its light-emitting elements may produce. Under the implementation of using laser diodes as light-emitting elements, it often results in the power management chip being unable to drive the light-emitting elements normally, thereby reducing the performance of the projection device.

SUMMARY

A projection device, a control circuit, and a control method thereof, which may expand the number of light-emitting elements and improve the work performance of the projection device, are provided in the disclosure.

The control circuit of the disclosure is configured to drive multiple light-emitting elements through a driving device. The control circuit includes multiple voltage level shifters and an operation circuit. The voltage level shifters respective receive multiple selection signals and shift peak voltage values of the selection signals to generate multiple processed signals. The operation circuit is coupled to the voltage level shifters, and executes a signal decoding operation according to the processed signals to generate multiple strobe signals. The operation circuit respectively provides the strobe signals to multiple drivers of a driving device, so that the drivers respectively generate multiple driving signals.

The projection device of the disclosure includes multiple light-emitting elements, a driving device, and a control circuit. The driving device respectively generates multiple driving signals according to multiple strobe signals to respectively drive the light-emitting elements. The control circuit is coupled to the driving device. The control circuit includes multiple voltage level shifters and an operation circuit. The voltage level shifters respective receive multiple selection signals and shift peak voltages of the selection signals to generate multiple processed signals. The operation circuit is coupled to the voltage level shifters, and executes a signal decoding operation according to the processed signals to generate multiple strobe signals. The operation circuit respectively provides the strobe signals to multiple drivers of a driving device, so that the drivers respectively generate multiple driving signals.

The control method of the driving device of the disclosure includes the following operation. Multiple voltage level shifters are provided to respectively receive multiple selection signals, and peak voltages of the selection signals are shifted to generate multiple processed signals. An operation circuit is provided to execute a signal decoding operation according to the processed signal to generate multiple strobe signals. The strobe signals are respectively provided to multiple drivers of a driving device by the operation circuit, so that the drivers respectively generate multiple driving signals.

Based on the above, the control circuit of the disclosure is configured to receive the selection signal from the encoder and obtain the driving signal by decoding the selection signal. The control circuit of the disclosure provides a strobe signal to a driving device, and enables the driving device to drive one or more light-emitting diodes according to the strobe signal. By setting the control circuit of the disclosure, the number of light-emitting elements of the projection device may be appropriately expanded, and the work performance of the projection device may be improved.

DETAILED DESCRIPTION OF DISCLOSED EMBODIMENTS

Figure 1:
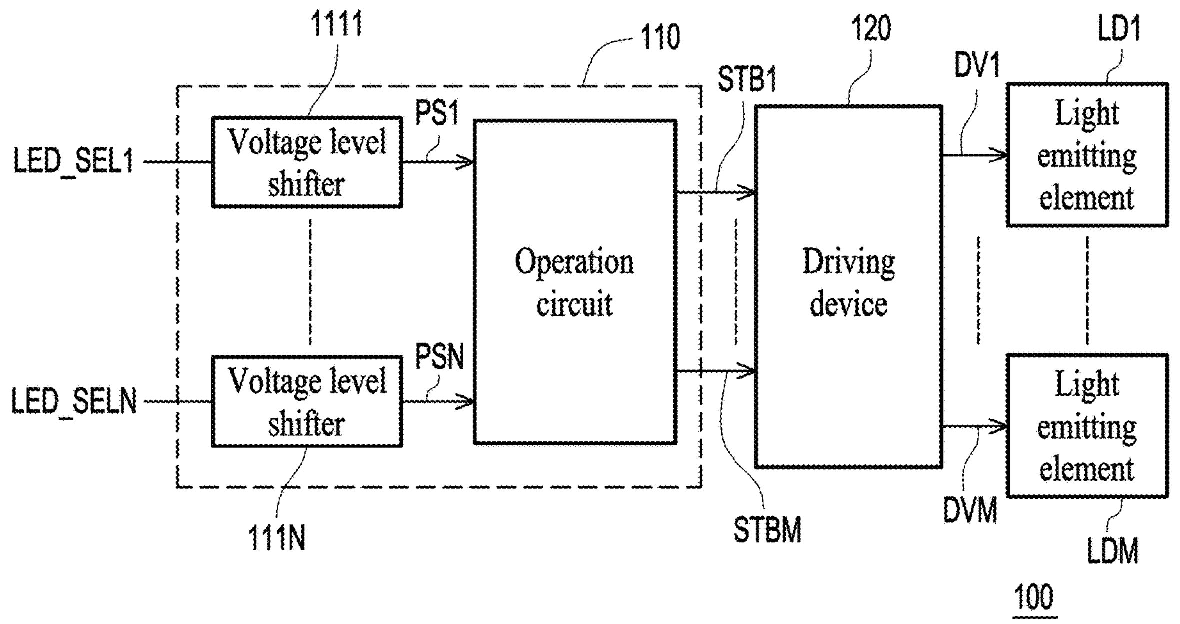
FIG. 1 is a schematic diagram of a projection device of a control circuit according to an embodiment of the disclosure.

Referring to FIG. 1, FIG. 1 is a schematic diagram of a projection device of a control circuit according to an embodiment of the disclosure. The projection device 100 may be a pico projector. The projection device 100 includes a control circuit 110 and a driving device 120. The driving device 120 is configured to drive multiple light-emitting elements LD1 to LDM. The light-emitting elements LD1 to LDM may be light-emitting diodes, laser diodes, or any other light-emitting elements well known to those skilled in the art.

In this embodiment, the control circuit 110 is coupled to the driving device 120. The control circuit 110 includes voltage level shifters 1111 to 111N and an operation circuit 112. The voltage level shifters 1111 to 111N may respectively receive the selection signals LED_SEL1 to LED_SELN. Here, the selection signals LED_SEL1 to LED_SELN may be encoded signals and are generated by an encoder external to the control circuit 110. The voltage level shifters 1111 to 111N respectively execute voltage shifting operations on the received selection signals LED_SEL1 to LED_SELN to respectively generate multiple processed signals PS1 to PSN. In detail, the voltage level shifters 1111 to 111N are configured to adjust the voltage peaks of the selection signals LED_SEL1 to LED_SELN from the first voltage to the second voltage to respectively generate the processed signals PS1 to PSN. In this embodiment, the first voltage may be less than the second voltage.

In addition, the operation circuit 112 is coupled to the voltage level shifters 1111 to 111N. The operation circuit 112 is configured to receive the processed signals PS1 to PSN respectively provided by the voltage level shifters 1111 to 111N, execute signal decoding operations on the processed signals PS1 to PSN, and generate multiple strobe signals STB1 to STBM through a signal decoding operation.

On the other hand, the computing circuit 112 is coupled to the driving device 120. The driving device 120 is further coupled to the light-emitting elements LD1 to LDM. The driving device 120 receives the strobe signals STB1 to STBM generated by the operation circuit 112, and the driving device 120 may respectively generate the driving signals DV1 to DVM according to the strobe signals STB1 to STBM. The driving device 120 respectively provides driving signals DV1 to DVM to the light-emitting elements LD1 to LDM, thereby controlling whether each of the light-emitting elements LD1 to LDM emits light, and further controls their luminous intensity.

In this embodiment, the operation circuit 112 may execute the signal decoding operation through a logical operation. The driving device 120 may respectively generate the driving signals DV1 to DVM as current signals or voltage signals according to the corresponding strobe signals STB1 to STBM, to respectively drive the light-emitting elements LD1 to LDM. In this embodiment, the values of the driving signals DV1 to DVM may be set by the designer according to the specifications of the light-emitting elements LD1 to LDM, and there are no specific limitations.

In this embodiment, the number of selection signals LED_SEL1 to ED_SELN may determine the number of controllable light-emitting elements LD1 to LDM. Taking N selection signals LED_SEL1 to LED_SELN as an example, the number of light-emitting elements LD1 to LDM controllable by the projection device 100 at most may be equal to 2 to the $N^{th}$ power, minus 1.

It is worth noting that in this embodiment, the control circuit 110 may be paired with the driving device 120. By decoding the selection signals LED_SEL1 to LED_SELN, the driving device 120 generates the driving signals DV1 to DVM to light up the light-emitting elements LD1 to LDM. In this way, in addition to the light-emitting elements originally provided in the projection device 100, multiple light-emitting elements LD1 to LDM may be expanded to serve as projection light sources. The display performance of the projection device 100 may be effectively improved.

Figure 2:
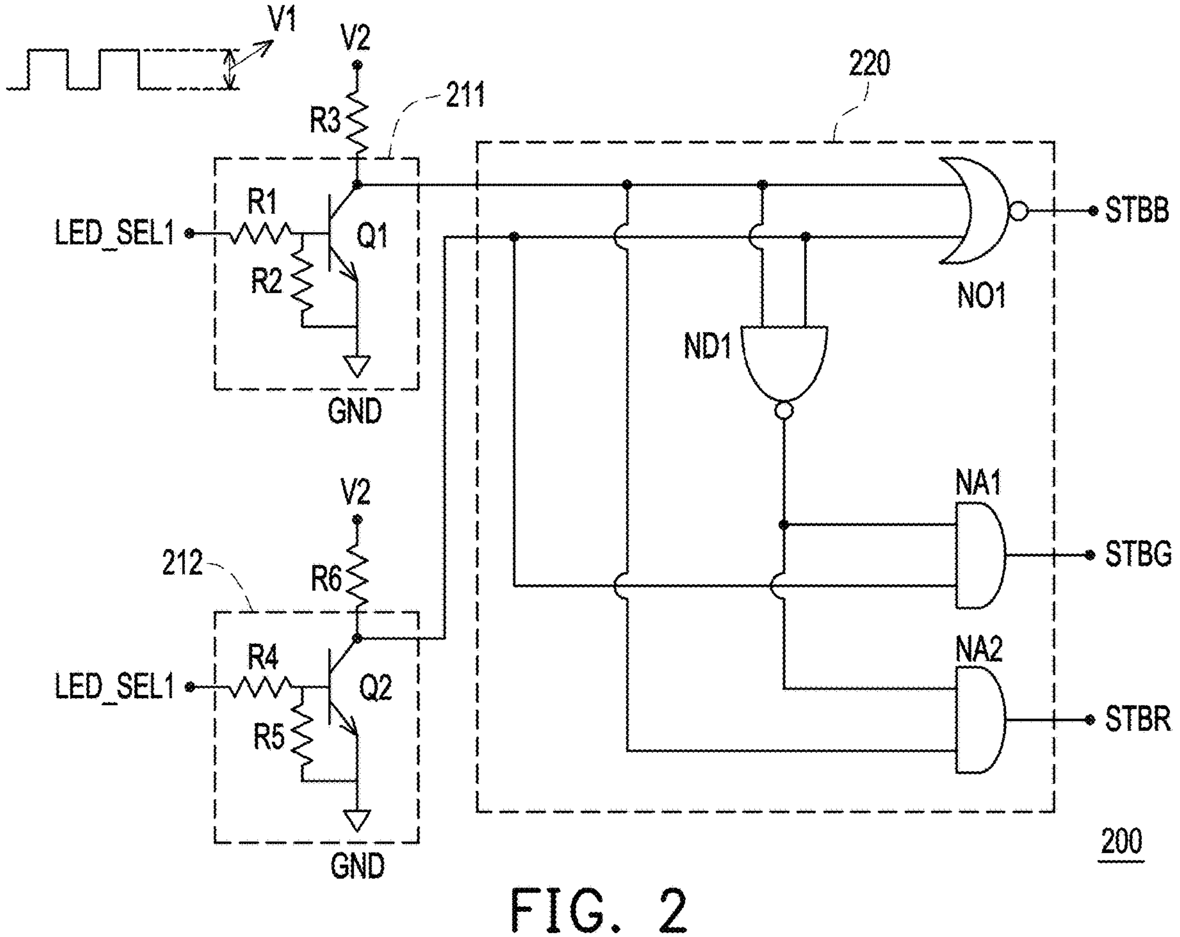
FIG. 2 is a schematic diagram of a control circuit of a projection device according to an embodiment of the disclosure.

Referring to FIG. 2, FIG. 2 is a schematic diagram of a control circuit of a projection device according to an embodiment of the disclosure. The control circuit 200 includes voltage level shifters 211 and 212, and an operation circuit 220. The voltage level shifters 211 and 212 respectively receive selection signals LED_SEL1 and LED_SEL2. The output terminals of the voltage level shifters 211 and 212 are coupled to the operation circuit 220, and respectively provide the processed signals PS1 and PS2 to the operation circuit 220.

In detail, the voltage level shifter 211 includes a transistor Q1 and resistors R1 to R3. The control terminal of the transistor Q1 is coupled to the resistor R1 and receives the selection signal LED_SEL1 through the resistor R1. The first terminal of the transistor Q1 is coupled to the resistor R3 and receives the operating voltage V2 through the resistor R3. In addition, the resistor R2 is coupled between the control terminal and the second terminal of the transistor Q1, and the second terminal of the transistor Q1 is coupled to the reference ground terminal GND. The voltage level shifter 212 includes a transistor Q2 and resistors R4 to R6. The control terminal of the transistor Q2 is coupled to the resistor R4 and receives the selection signal LED_SEL2 through the resistor R4. The first terminal of the transistor Q2 is coupled to the resistor R6 and receives the operating voltage V2 through the resistor R6. In addition, the resistor R5 is coupled between the control terminal and the second terminal of the transistor Q2, and the second terminal of the transistor Q2 is coupled to the reference ground terminal GND.

In terms of operation details, the voltage level shifters 211 and 212 may perform similar operations. Here, the voltage level shifter 211 is taken as an example for description. The selection signal LED_SEL1 may be a square wave transitioning between the operating voltage V1 and the ground voltage. The operating voltage V1 may be less than the operating voltage V2. When the selection signal LED_SEL1 is the operating voltage V1, the transistor Q1 may be turned on and the generated processed signal PS1 may be pulled down to the ground voltage. In contrast, when the selection signal LED_SEL1 is at the ground voltage, the transistor Q1 may be turned off, and the generated processed signal PS1 is pulled up to the operating voltage V2. That is, the peak voltage of the selection signal LED_SEL1 is equal to the operating voltage V1. Through the voltage shifting operation of the voltage level shifter 211, the processed signal PS1 generated has a peak voltage equal to the operating voltage V2. In this embodiment, the operating voltage V1 may be, for example, 1.8V, and the operating voltage V2 may be, for example, 3.3V, but not limited thereto.

It is worth mentioning that the voltage level shifters 211 and 212 in the embodiment of the disclosure are reverse-type voltage level shifters. The logic values of the selection signals LED_SEL1 and LED_SEL2 and the corresponding processed signals PS1 and PS2 are complementary to each other.

On the other hand, in this embodiment, the operation circuit 220 includes a NOR gate NO2, a NAND gate ND1, and AND gates AD1 and AD2. The NOR gate NO2 receives the processed signals PS1 and PS2, and executes a NOR operation on the processed signals PS1 and PS2 to generate the strobe signal STBB. The NAND gate ND1 receives the processed signals PS1 and PS2, and executes a NAND operation on the processed signals PS1 and PS2 to generate the signal A1. The AND gate AD1 receives the signal A1 and the processed signal PS2, and executes an AND operation on the signal A1 and the processed signal PS2 to generate the strobe signal STBG. The AND gate AD2 receives the signal A1 and the processed signal PS1, and executes an AND operation on the signal A1 and the processed signal PS1 to generate the strobe signal STBR.

The operation circuit 220 may transmit the strobe signals STBB, STBG, and STBR to the driving device, so that the driving device generates a driving signal to drive the corresponding light-emitting element. In this embodiment, the strobe signal STBB may correspond to a blue light-emitting element; the strobe signal STBG may correspond to a green light-emitting element; and the strobe signal STBR may correspond to a red light-emitting element.

In this embodiment, the truth table of the selection signals LED_SEL1, LED_SEL2 and the strobe signals STBB, STBG, and STBR is as shown in the following table:

| LED_SEL1 | LED_SEL2 | STBB | STBG | STBR |
|---|---|---|---|---|
| 0 | 0 | 0 | 0 | 0 |
| 0 | 1 | 0 | 0 | 1 |

-continued

| LED_SEL1 | LED_SEL2 | STBB | STBG | STBR |
|---|---|---|---|---|
| 1 | 0 | 0 | 1 | 0 |
| 1 | 1 | 1 | 0 | 0 |

It may be known from the above truth table that in this embodiment, according to the logic values of the selection signals LED_SEL1 and LED_SEL2, all three light-emitting elements may be turned off, or one of the three light-emitting elements may be lit. It is worth mentioning that the logic values of the selection signals LED_SEL1 and LED_SEL2 may dynamically change over time. In this way, through the combination of the logic values of the selection signals LED_SEL1 and LED_SEL2, each light-emitting element may be dynamically lit or turned off. By controlling the lighting time of each light-emitting element, the brightness of each light-emitting element may be adjusted.

Please note here that in the embodiment of the disclosure, only two selection signals LED_SEL1 and LED_SEL2 are used for explanation, which does not mean that the number of selection signals in the embodiment of the disclosure is limited to two. Within the scope of the disclosure, the number of selection signals received by the control circuit may also be greater than 2, without any specific limitation.

In addition, the circuit details of the voltage level shifters 211 and 212 are not limited to those shown in FIG. 2. Any circuit architecture of a voltage level shifter that is well known to those skilled in the art may be applied to the disclosure without particular limitations. Similarly, the logic gate structure in the operation circuit 220 is only an example for illustration and is not intended to limit the implementation scope of the disclosure. Those skilled in the art know that under the same operation function, the combination of logic gates in a logic circuit may be transformed in a variety of ways.

Figure 3:
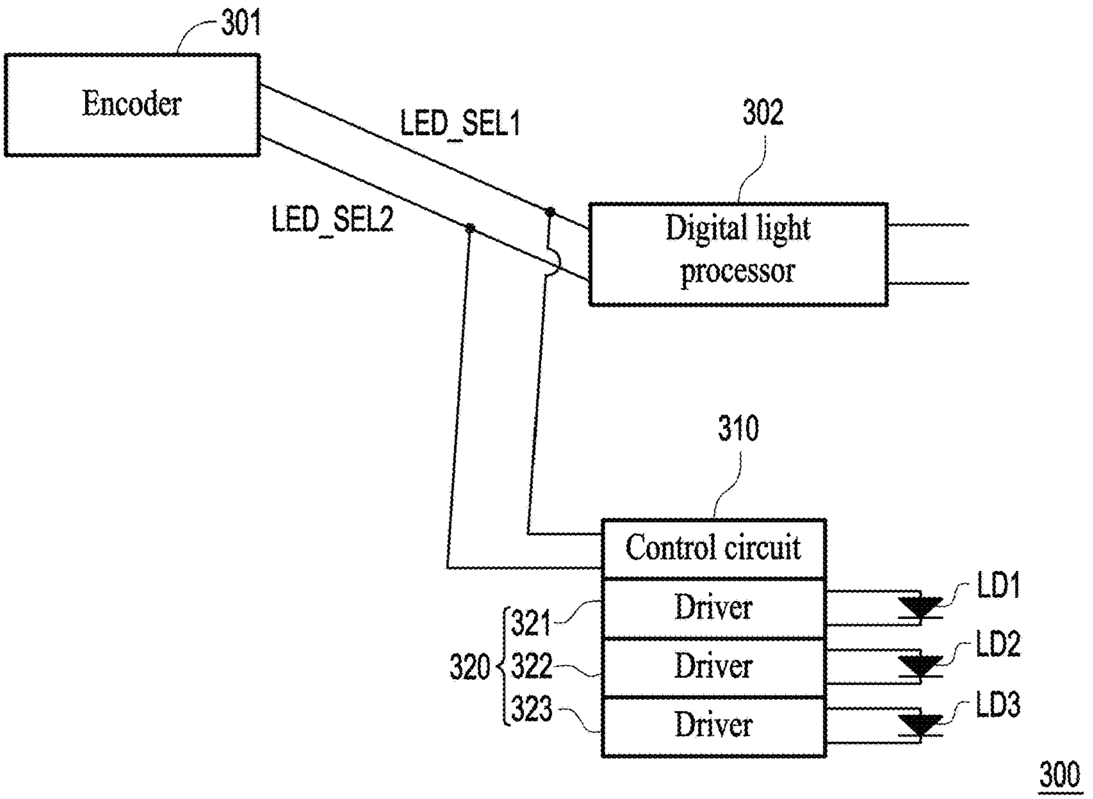
FIG. 3 is a schematic diagram of a projection device according to an embodiment of the disclosure.

Referring to FIG. 3, FIG. 3 is a schematic diagram of a projection device according to an embodiment of the disclosure. The projection device 300 includes an encoder 301, a control circuit 310, a driving device 320, and light-emitting elements LD1 to LD3. The encoder 301 sends the encoded selection signals LED_SEL1 and LED_SEL2. The control circuit 310 is coupled to the encoder 301 and receives the selection signals LED_SEL1 and LED_SEL2. The control circuit 310 decodes the selection signals LED_SEL1 and LED_SEL2 and generates multiple strobe signals.

The driving device 320 includes drivers 321, 322, and 323. The drivers 321, 322, and 323 are respectively coupled to the light-emitting elements LD1, LD2, and LD3. The drivers 321, 322, and 323 are coupled to the control circuit 310 and respectively receive the strobe signals generated by the control circuit 310. Furthermore, the drivers 321, 322, and 323 respectively generate multiple driving signals according to the received strobe signals, and respectively drive the light-emitting elements LD1, LD2, and LD3 through the driving signals.

The implementation details of the control circuit 310 have been described in detail in the foregoing embodiments, and are not repeated herein.

In addition, the drivers 321, 322, and 323 may be current drivers or voltage drivers for generating driving signals of current signals or voltage signals to respectively drive the light-emitting elements LD1, LD2, and LD3. In this embodiment, the drivers 321, 322, and 323 may be implemented using any driving circuit for light-emitting elements that is well known to those skilled in the art, without specific limitations. The encoder 301 may be disposed in a control chip and implemented through digital circuits.

In this embodiment, the projection device 300 may be a pico projector. The encoder 301 may also be coupled to a digital light processor (DLP) 302. The digital light processor 302 is originally configured to drive light-emitting elements. However, the number of light-emitting elements required in the projection device 300 needs to be increased, and the digital light processor 302 does not have enough driving capability to drive the light-emitting elements LD1, LD2, and LD3. Therefore, the projection device 300 of the disclosure may effectively expand the number of light-emitting elements in the projection device 300 by disposing the control circuit 310 and the driving device 320 to execute driving operations of the light-emitting elements LD1, LD2, and LD3.

In this embodiment, the light-emitting element originally connected to the output terminal of the digital light processor 302 may be removed and left in an open connection state.

Incidentally, in this embodiment, the number of light-emitting elements is increased according to actual requirements. In this way, the number of drivers in the driving device 320 may be expanded corresponding to the number of light-emitting elements, and the work performance of the projection device 300 is improved.

Figure 4:
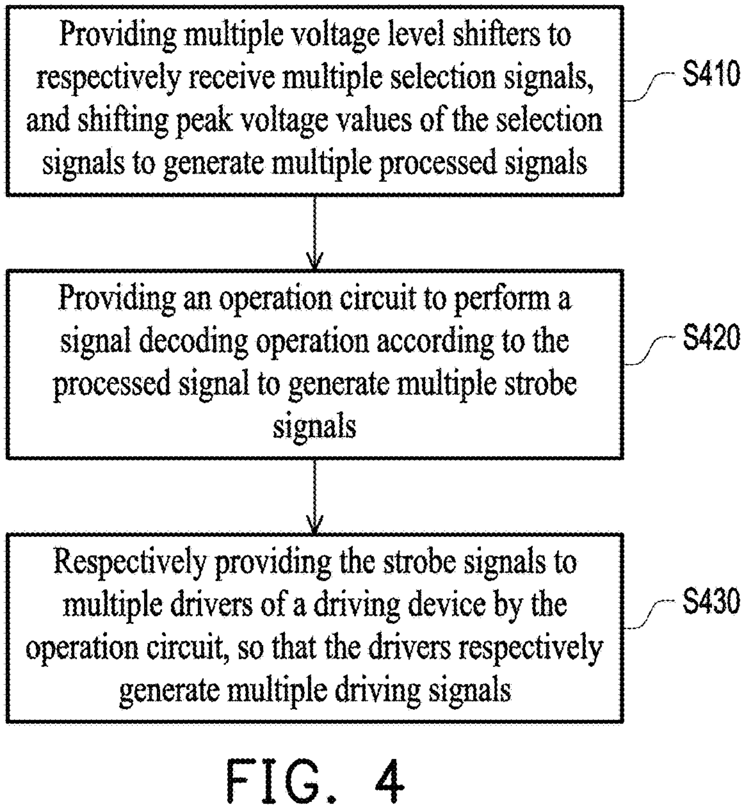
FIG. 4 is a flowchart of a control method of a driving device according to an embodiment of the disclosure.

Referring to FIG. 4, FIG. 4 is a flowchart of a control method of a driving device according to an embodiment of the disclosure. In step S410, multiple voltage level shifters are provided to respectively receive multiple selection signals, and shift peak voltages of the selection signals to generate multiple processed signals. In step S420, an operation circuit is provided to execute a signal decoding operation according to the processed signal to generate multiple strobe signals. Furthermore, in step S430, strobe signals is respectively provided to multiple drivers in the driving device by the operation circuit, so that the drivers respectively generate multiple driving signals.

The implementation details of the above steps have been described in detail in the foregoing embodiment, and are not repeated herein.

In summary, the control circuit of the disclosure generates multiple strobe signals by decoding the selection signal. The driving device may generate driving signals according to the strobe signals to drive the light-emitting elements. In an embodiment of the disclosure, the projection device may increase the number of driveable light-emitting elements and improve the performance of the projection device through a control circuit with a simple structure and a corresponding driving device.

What is claimed is:

1. A control circuit, driving a plurality of light-emitting elements through a driving device, the control circuit comprising:

a plurality of voltage level shifters, respectively receiving a plurality of selection signals, and shifting peak voltages of the selection signals to generate a plurality of processed signals; and an operation circuit, coupled to the voltage level shifters, and executing a signal decoding operation according to the processed signals to generate a plurality of strobe signals, wherein the operation circuit respectively provides the strobe signals to a plurality of drivers of the driving device, so that the drivers respectively generate a plurality of driving signals.

2. The control circuit according to claim 1, wherein each of the voltage level shifters adjusts the peak voltage of each of the corresponding selection signals from a first voltage to a second voltage, wherein the first voltage is less than the second voltage.

3. The control circuit according to claim 1, wherein each of the voltage level shifters comprises:

a first resistor, having a first terminal receiving an operating voltage;

a second resistor, having a first terminal receiving each of the corresponding selection signals;

a transistor, having a first terminal coupled to a second terminal of the first resistor, a control terminal of the transistor coupled to a second terminal of the second resistor, a second terminal of the transistor connected to a reference ground terminal; and a third resistor, coupled between the second terminal and the control terminal of the transistor, wherein the first terminal of the transistor generates each of the corresponding processed signals.

4. The control circuit according to claim 3, wherein the operating voltage is greater than the peak voltage of each of the selection signals.

5. The control circuit according to claim 1, wherein the operation circuit executes the signal decoding operation on the processed signals through executing a logical operation, and generates the strobe signals.

6. The control circuit according to claim 1, wherein the selection signals comprise a first selection signal and a second selection signal, the operation circuit executes a NOR operation on a first processed signal and a second processed signal to generate a first strobe signal; the operation circuit executes a NAND operation on the first processed signal and the second processed signal to generate a first signal, the operation circuit executes an AND operation on the first signal and the second processed signal to generate a second strobe signal; the operation circuit executes an AND operation on the first signal and the first processed signal to generate a third strobe signal, wherein the first processed signal corresponds to the first selection signal, and the second processed signal corresponds to the second selection signal.

7. The control circuit according to claim 6, wherein the operation circuit comprises:

a NOR gate, receiving the first processed signal and the second processed signal, and generating the first strobe signal;

a NAND gate, receiving the first processed signal and the second processed signal, and generating the first signal;

a first AND gate, receiving the first signal and the second processed signal, and generating the second strobe signal; and a second AND gate, receiving the first signal and the first processed signal, and generating the third strobe signal.

8. A projection device, comprising:

a plurality of light-emitting elements;

a driving device, respectively generating a plurality of driving signals according to a plurality of strobe signals to respectively drive the light-emitting elements; and a control circuit, coupled to the driving device, the control circuit comprising:

a plurality of voltage level shifters, respectively receiving a plurality of selection signals, and shifting peak voltages of the selection signals to generate a plurality of processed signals; and an operation circuit, coupled to the voltage level shifters, and executing a signal decoding operation according to the processed signals to generate a plurality of strobe signals.

9. The projection device according to claim 8, wherein each of the voltage level shifters adjusts the peak voltage of each of the corresponding selection signals from a first voltage to a second voltage, wherein the first voltage is less than the second voltage.

10. The projection device according to claim 8, wherein each of the voltage level shifters comprises:

a first resistor, having a first terminal receiving an operating voltage;

a second resistor, having a first terminal receiving each of the corresponding selection signals;

a transistor, having a first terminal coupled to a second terminal of the first resistor, a control terminal of the transistor coupled to a second terminal of the second resistor, a second terminal of the transistor connected to a reference ground terminal; and a third resistor, coupled between the second terminal and the control terminal of the transistor, wherein the first terminal of the transistor generates each of the corresponding processed signals.

11. The projection device according to claim 10, wherein the operating voltage is greater than the peak voltage of each of the selection signals.

12. The projection device according to claim 8, wherein the operation circuit executes the signal decoding operation on the processed signals through executing a logical operation, and generates the strobe signals.

13. The projection device according to claim 8, wherein the selection signals comprise a first selection signal and a second selection signal, the operation circuit executes a NOR operation on a first processed signal and a second processed signal to generate a first strobe signal; the operation circuit executes a NAND operation on the first processed signal and the second processed signal to generate a first signal, the operation circuit executes an AND operation on the first signal and the second processed signal to generate a second strobe signal; the operation circuit executes an AND operation on the first signal and the first processed signal to generate a third strobe signal, wherein the first processed signal corresponds to the first selection signal, and the second processed signal corresponds to the second selection signal.

14. The projection device according to claim 8, further comprising:

an encoder, coupled to the control circuit and configured to provide the selection signals.

15. A control method of a driving device, wherein the driving device is configured to drive a plurality of light-emitting elements, the control method comprises:

providing a plurality of voltage level shifters to respectively receive a plurality of selection signals and shift peak voltages of the selection signals to generate a plurality of processed signals;

providing an operation circuit to execute a signal decoding operation according to the processed signals to generate a plurality of strobe signals; and respectively providing the strobe signals to a plurality of drivers of the driving device by the operation circuit, so that the drivers respectively generate a plurality of driving signals.

16. The control method according to claim 15, wherein shifting the peak voltages of the selection signals to generate the processed signals comprises:

adjusting the peak voltage of each of the corresponding selection signals from a first voltage to a second voltage, wherein the first voltage is less than the second voltage.

17. The control method according to claim 15, wherein providing the operation circuit to execute the signal decoding operation according to the processed signals to generate the strobe signals comprises:

executing the signal decoding operation on the processed signals through executing a logical operation, and generating the strobe signals.

18. The control method according to claim 17, wherein the selection signals comprise a first selection signal and a second selection signal, wherein providing the operation circuit to execute the signal decoding operation according to the processed signals to generate the strobe signals further comprises:

executing a NOR operation on a first processed signal and a second processed signal to generate a first strobe signal;

executing a NAND operation on the first processed signal and the second processed signal to generate a first signal;

executing an AND operation on the first signal and the second processed signal to generate a second strobe signal; and executing an AND operation on the first signal and the first processed signal to generate a third strobe signal, wherein the first processed signal corresponds to the first selection signal, and the second processed signal corresponds to the second selection signal.

* * * * *